United States Patent
Almulla et al.

(10) Patent No.: US 12,240,757 B2
(45) Date of Patent: Mar. 4, 2025

(54) SYNGAS PRODUCTION VIA SUPERCRITICAL WATER

(71) Applicant: Saudi Arabian Oil Company, Dhahran (SA)

(72) Inventors: Faisal Almulla, Dhahran (SA); Ki-Hyouk Choi, Dhahran (SA); Mazin Fathi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 691 days.

(21) Appl. No.: 17/574,310

(22) Filed: Jan. 12, 2022

(65) Prior Publication Data

US 2023/0219812 A1 Jul. 13, 2023

(51) Int. Cl.
  *C01B 3/16* (2006.01)
  *B01J 7/02* (2006.01)
  *B01J 8/06* (2006.01)

(52) U.S. Cl.
  CPC ...... *C01B 3/16* (2013.01); *B01J 7/02* (2013.01); *B01J 8/067* (2013.01); *B01J 2208/065* (2013.01); *C01B 2203/0283* (2013.01); *C01B 2203/0805* (2013.01); *C01B 2203/1235* (2013.01); *C01B 2203/1614* (2013.01)

(58) Field of Classification Search
  None
  See application file for complete search history.

(56) References Cited

U.S. PATENT DOCUMENTS

| | | | |
|---|---|---|---|
| 2,532,514 A | * | 12/1950 | Phinney ............... C01B 3/36 422/198 |
| 3,232,727 A | | 2/1966 | Guptill et al. |
| 3,862,899 A | | 1/1975 | Murphy et al. |
| 3,870,481 A | | 3/1975 | Hegarty |
| 6,352,674 B2 | | 3/2002 | Matsubara et al. |

(Continued)

OTHER PUBLICATIONS

Ferreira-Pinto et al. "Experimental Basic Factors in the Production of H2 via Supercritical Water Gasification", International Journal of Hydrogen Energy, 44(47), 2019, pp. 25365-25383.

(Continued)

*Primary Examiner* — John J Figueroa
(74) *Attorney, Agent, or Firm* — Bracewell LLP; Constance G. Rhebergen; Eleanor T. Porter

(57) ABSTRACT

A method to produce syngas from a feed oil comprising the steps of increasing a pressure of a slurry catalyst; increasing a temperature of the pressurized slurry stream; increasing a pressure of the feed oil; increasing a temperature of the pressurized feed stream; mixing the hot slurry stream and the hot oil stream; increasing a temperature of the mixed stream in a combined heater to produce a hot mixed stream; maintaining upgrading reactions of hydrocarbons in the supercritical reactor to produce a supercritical effluent; reducing a pressure of the supercritical effluent; separating the depressurized effluent in a separator to produce a gas stream; separating the gas stream to produce a light hydrocarbon stream; mixing the light hydrocarbon stream and a catalyst feed; introducing the hot feed to a steam reformer; maintaining water gas shift reactions of the light hydrocarbon gases in the steam reformer to produce a reformer effluent.

20 Claims, 2 Drawing Sheets

(56) References Cited

U.S. PATENT DOCUMENTS

| | | | |
|---|---|---|---|
| 6,504,068 | B1 | 1/2003 | Matsubara et al. |
| 6,863,879 | B2 | 3/2005 | Rojey et al. |
| 8,784,650 | B2 | 7/2014 | Cui et al. |
| 8,974,701 | B2 | 3/2015 | Koseoglu et al. |
| 2004/0232046 | A1 | 11/2004 | Tanaka et al. |
| 2009/0170968 | A1 | 7/2009 | Nahas et al. |
| 2011/0104045 | A1 | 5/2011 | Grover et al. |
| 2012/0298551 | A1* | 11/2012 | Inga ............... B01J 8/0278 422/187 |
| 2013/0067815 | A1* | 3/2013 | Koseoglu ........... F01K 23/067 252/373 |
| 2016/0045841 | A1* | 2/2016 | Kaplan ............... C01B 32/05 429/49 |
| 2019/0316046 | A1 | 10/2019 | Tian et al. |

OTHER PUBLICATIONS

Lee et al. "Hydrogen production from fluidized bed steam reforming of hydrocarbons", Korean Journal of Chemical Engineering 15, No. 6, 1998, pp. 658-662.

Park et al. "Gasification Reaction of Organic Compounds Catalyzed by RuO 2 in Supercritical Water", Chemical Communications, (6), 2003, pp. 694-695.

* cited by examiner

SYNGAS PRODUCTION VIA SUPERCRITICAL WATER

TECHNICAL FIELD

Disclosed are methods for converting heavy oil. Specifically, disclosed are methods and systems for converting heavy oil into syngas utilizing supercritical water.

BACKGROUND

Hydrogen in refineries has been increasingly utilized. It is mainly produced by steam reforming. However, the feedstock used for steam reforming is limited to natural gas and light naphtha and cannot process heavy or residue oils due to coke formation.

Residue gasification of residue oils is also known in the art. The conventional gasification process uses partial oxidation to convert carbonaceous materials, such as coal, petroleum, biofuel, or biomass, with oxygen into synthesis gas and power. The main advantages of residue gasification are the production of hydrogen and chemicals and reduction of carbon footprint. The typical operating conditions in the conventional gasification process are pressure of 60 bars and temperature of between 1300° C. to 1700° C.

SUMMARY

Disclosed are methods for upgrading oil. Specifically, disclosed are methods and systems for upgrading heavy oil with catalysts produced in situ.

In a first aspect, a method to produce syngas from a feed oil is provided. The method includes the steps of increasing a pressure of a slurry catalyst in a catalyst pump to produce a pressurized slurry stream, where the slurry catalyst includes catalyst particles dispersed in deionized water, increasing a temperature of the pressurized slurry stream in a slurry heater to produce a hot slurry stream, increasing a pressure of the feed oil in an oil pump to produce a pressurized feed stream, where the feed oil includes a heavy oil, increasing a temperature of the pressurized feed stream in an oil heater to produce a hot oil stream, where the temperature of the hot oil stream is between 100° C. and 380° C., mixing the hot slurry stream and the hot oil stream in a mixer to produce a mixed stream, increasing a temperature of the mixed stream in a combined heater to produce a hot mixed stream, where the hot mixed stream includes an oil-in-water emulsion includes catalyst particles dispersed in the emulsion such that precipitation of the catalyst particles is minimized, introducing the hot mixed stream to a supercritical reactor, where the supercritical reactor is at a temperature between 380° C. and 500° C. and a pressure between 22 MPa and 35 MPa, maintaining upgrading reactions of hydrocarbons in the supercritical reactor to produce a supercritical effluent, where the catalyst particles catalyze the upgrading reactions, where a residence time in supercritical reactor is in the range of 0.01 minutes to 1.0 minute, reducing a pressure of the supercritical effluent in a pressure let-down device to produce a depressurized effluent, separating the depressurized effluent in a separator to produce a gas stream, a catalyst-containing water stream and a liquid hydrocarbon stream, where the gas stream includes light hydrocarbon gases, syngas, carbon dioxide, and combinations of the same, where the light hydrocarbon gases are selected from the group consisting of methane, ethane, propane, butane, and combinations of the same, separating the gas stream in a high pressure separator to produce a light gas stream and a light hydrocarbon stream, where the light hydrocarbon stream includes the light hydrocarbon gases, mixing the light hydrocarbon stream and a catalyst feed in a reformer mixer to produce a combined feed, where the combined includes light hydrocarbon gases, water, and catalyst, increasing a temperature of the combined feed in a reformer heater to produce a hot feed, where the hot feed is at a temperature between 500° C. and 800° C., introducing the hot feed to a steam reformer, where the steam reformer is at a temperature between 500° C. and 800° C. and a pressure between atmospheric pressure and 0.5 MPa, maintaining water gas shift reactions of the light hydrocarbon gases in the steam reformer to produce a reformer effluent, where the catalyst from the catalyst feed catalyzes the water gas shift reactions, and separating the reformer effluent in a product separator to produce a product gas, where the product gas includes syngas.

In certain aspects, the steam reformer is a fixed bed reactor. In certain aspects, the steam reformer is a moving bed reactor. In certain aspects, the method further includes the step of introducing an oxygen stream to the supercritical reactor, where the oxygen source is selected from the group consisting of oxygen gas, hydrogen peroxide, peroxides, air, and combinations of the same. In certain aspects, a mass flow ratio of water to oil in the hot mixed stream is in the range of 5 to 15. In certain aspects, the liquid hydrocarbon stream includes liquid hydrocarbons, where the liquid hydrocarbons are selected from the group consisting of diesel, naphtha, distillates, heavy oils, and combinations of the same. In certain aspects, the catalyst in the supercritical reactor is the same catalyst in the steam reformer. In certain aspects, a temperature of the hot slurry is between 350° C. and 500° C. In certain aspects, a pressure of the depressurized effluent is between ambient pressure and 0.5 MPa. In certain aspects, the heavy oil of the feed oil is selected from the group consisting of whole range crude oil, distilled crude oil, residue oil, topped crude oil, product streams from oil refineries, product streams from steam cracking processes, liquefied coals, liquid products recovered from oil or tar sands, bitumen, oil shale, asphaltene, biomass hydrocarbons, liquids products from gas-to-liquid GTL) processes, and combinations of the same.

In a second aspect, a system to produce syngas from a feed oil is provided. The system includes a catalyst pump configured to increase a pressure of a slurry catalyst to produce a pressurized slurry stream, where the slurry catalyst includes catalyst particles dispersed in deionized water, a slurry heater fluidly connected to the catalyst pump, the slurry heater configured to increase a temperature of the pressurized slurry stream to produce a hot slurry stream, an oil pump configured to increase a pressure of the feed oil to produce a pressurized feed stream, where the feed oil includes a heavy oil, an oil heater fluidly connected to the oil pump, the oil heater configured to increase a temperature of the pressurized feed stream to produce a hot oil stream, where the temperature of the hot oil stream is between 100° C. and 380° C., a mixer fluidly connected to the slurry heater and the oil heater, the mixer configured to mix the hot slurry stream and the hot oil stream to produce a mixed stream, a combined heater fluidly connected to the mixer, the combined heater configured to increase a temperature of the mixed stream to produce a hot mixed stream, where the hot mixed stream includes an oil-in-water emulsion includes catalyst particles dispersed in the emulsion such that precipitation of the catalyst particles is minimized, a supercritical reactor fluidly connected to the combined heater, the supercritical reactor configured to maintain upgrading reactions of hydrocarbons in the hot mixed stream to produce a supercritical effluent, where the catalyst particles catalyze the upgrading reactions, where a residence time in supercritical reactor is in the range of 0.01 minutes to 1.0 minute, where the supercritical reactor is at a temperature between 380° C. and 500° C. and a pressure between 22 MPa and 35 MPa, a pressure let-down device fluidly connected to the supercritical reactor, the pressure let-down device configured to reduce a pressure of the supercritical effluent to produce a depressurized effluent, a separator fluidly connected to the pressure let-down device, the separator configured to separate the depressurized effluent to produce a gas stream, a catalyst-containing water stream and a liquid hydrocarbon stream, where the gas stream includes light hydrocarbon gases, syngas, carbon dioxide, and combinations of the same, where the light hydrocarbon gases are selected from the group consisting of methane, ethane, propane, butane, and combinations of the same, a high pressure separator fluidly connected to the separator, the high pressure separator configured to separate the gas stream to produce a light gas stream and a light hydrocarbon stream, where the light hydrocarbon stream includes the light hydrocarbon gases, a reformer mixer fluidly connected to the high pressure separator, the reformer mixer configured to mix the light hydrocarbon stream and a catalyst feed to produce a combined feed, where the combined includes light hydrocarbon gases, water, and catalyst, a reformer heater fluidly connected to the reformer mixer, the reformer heater configured to increase a temperature of the combined feed to produce a hot feed, where the hot feed is at a temperature between 500° C. and 800° C., a steam reformer fluidly connected to the reformer heater, the steam reformer configured to maintain water gas shift reactions of the light hydrocarbon gases to produce a reformer effluent, where the catalyst from the catalyst feed catalyzes the water gas shift reactions, where the steam reformer is at a temperature between 500° C. and 800° C. and a pressure between atmospheric pressure and 0.5 MPa, and a product separator fluidly connected to the steam reformer, the product separator configured to separate the reformer effluent to produce a product gas, where the product gas includes syngas.

In certain aspects, the supercritical reactor is a tubular reactor.

BRIEF DESCRIPTION OF THE DRAWINGS

These and other features, aspects, and advantages of the scope will become better understood with regard to the following descriptions, claims, and accompanying drawings. It is to be noted, however, that the drawings illustrate only several embodiments and are therefore not to be considered limiting of the scope as it can admit to other equally effective embodiments.

Figure 1:
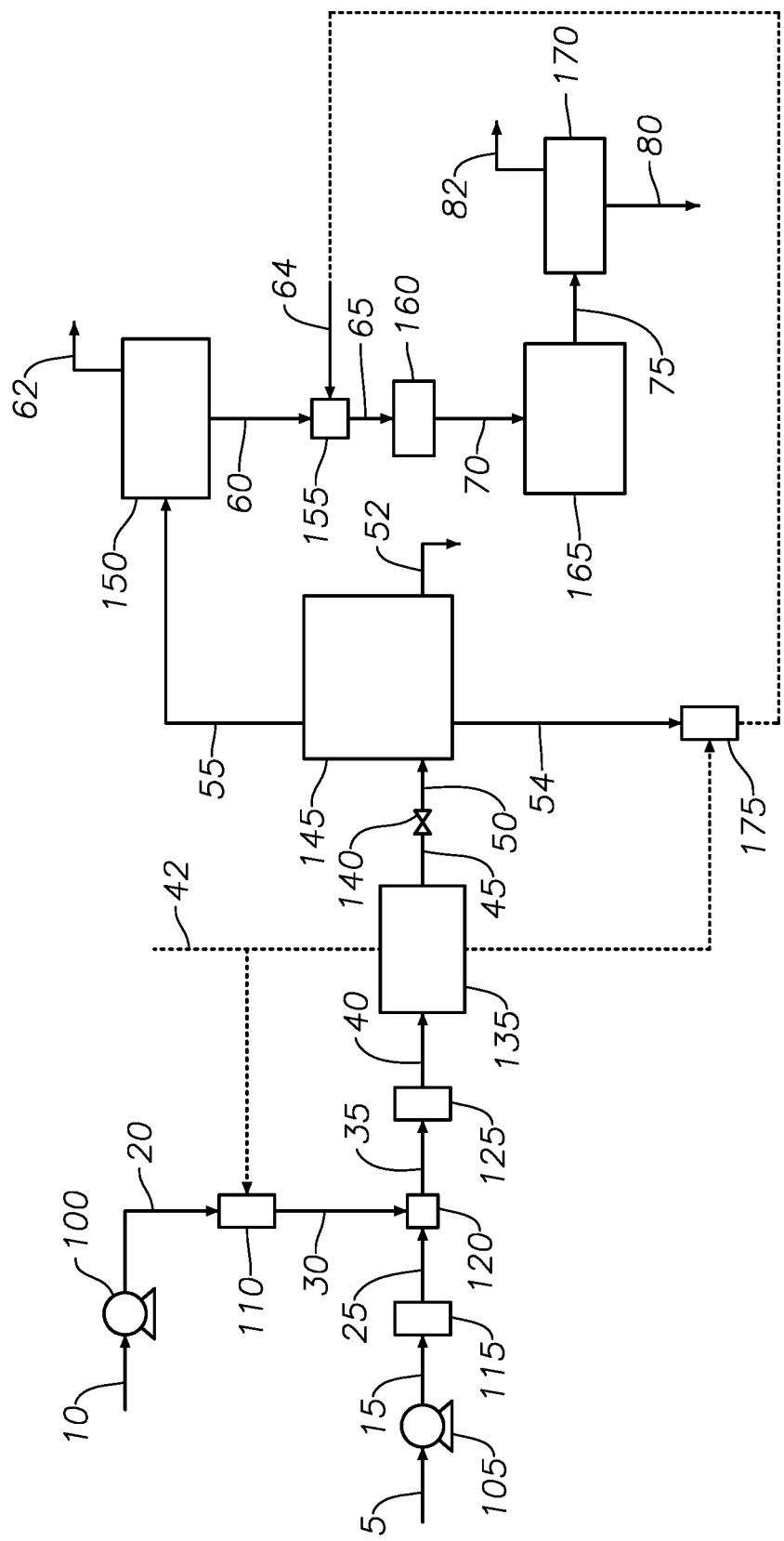
FIG. 1 provides a process diagram of an embodiment of the integrated supercritical reactor and steam reformer.

In the accompanying Figures, similar components or features, or both, may have a similar reference label.

DETAILED DESCRIPTION

While the scope of the apparatus and method will be described with several embodiments, it is understood that one of ordinary skill in the relevant art will appreciate that many examples, variations and alterations to the apparatus and methods described here are within the scope and spirit of the embodiments.

Accordingly, the embodiments described are set forth without any loss of generality, and without imposing limitations, on the embodiments. Those of skill in the art understand that the scope includes all possible combinations and uses of particular features described in the specification.

The system and methods described integrate a supercritical reactor and steam reformer to produce syngas from a heavy oil. Advantageously, the systems and methods described enable reforming of residue oil to produce hydrogen. Advantageously, the systems and methods add value to atmospheric residue and vacuum residue fractions. Advantageously, the systems and methods enable heavy oil gasification combining a supercritical water reactor and a steam reformer to produce syngas from a heavy oil. Advantageously, the use of slurry catalyst means mass transfer is unlimited bringing stability in supercritical conditions compared to a heterogeneous catalyst. Advantageously, the presence of supercritical water in the vicinity of catalyst particle surface reduces deposition of coke and other adsorbed materials.

As used throughout, "syngas" or "synthesis gas" refers to a gas stream that is a mix of hydrogen and carbon monoxide.

As used throughout, "external supply of hydrogen" refers to the addition of hydrogen to the feed to the reactor or to the reactor itself. For example, a reactor in the absence of an external supply of hydrogen means that the feed to the reactor and the reactor are in the absence of added hydrogen, gas ($H_2$) or liquid, such that no hydrogen (in the form $H_2$) is a feed or a part of a feed to the reactor.

As used throughout, "supercritical water" refers to water at a temperature at or greater than the critical temperature of water and at a pressure at or greater than the critical pressure of water. The critical temperature of water is 373.946° C. The critical pressure of water is 22.06 megapascals (MPa). It is known in the art that hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water-gas shift reaction. In the water-gas shift reaction, carbon monoxide and water react to produce carbon dioxide and hydrogen. The hydrogen can be transferred to hydrocarbons in desulfurization reactions, demetallization reactions, denitrogenation reactions, and combinations.

As used throughout, "coke" refers to the toluene insoluble material present in petroleum.

As used throughout, "cracking" refers to the breaking of hydrocarbons into smaller ones containing few carbon atoms due to the breaking of carbon-carbon bonds.

As used throughout, "upgrade" or "upgrading" means one or all of increasing API gravity, decreasing the amount of heteroatoms, including sulfur atoms, nitrogen atoms, metal atoms, and oxygen atoms, decreasing the amount of asphaltene, increasing the middle distillate yield, decreasing the viscosity, and combinations of the same, in a process outlet stream relative to the process feed stream. One of skill in the art understands that upgrade can have a relative meaning such that a stream can be upgraded in comparison to another stream, but can still contain undesirable components such as heteroatoms.

As used throughout, "upgrading reactions" refers to reactions that can upgrade a hydrocarbon stream including cracking, isomerization, oligomerization, dealkylation, dimerization, aromatization, cyclization, desulfurization, denitrogenation, deasphalting, demetallization, and combinations of the same.

It is known in the art that hydrocarbon reactions in supercritical water upgrade heavy oil and crude oil containing sulfur compounds to produce products that have lighter fractions. Supercritical water has unique properties making it suitable for use as a petroleum reaction medium where the reaction objectives can include conversion reactions, desulfurization reactions denitrogenation reactions, and demetallization reactions. Supercritical water is water at a temperature at or greater than the critical temperature of water and at a pressure at or greater than the critical pressure of water. The critical temperature of water is 373.946° C. The critical pressure of water is 22.06 megapascals (MPa). Advantageously, at supercritical conditions water acts as both a hydrogen source and a solvent (diluent) in conversion reactions, desulfurization reactions and demetallization reactions and a catalyst is not needed. Hydrogen from the water molecules is transferred to the hydrocarbons through direct transfer or through indirect transfer, such as the water-gas shift reaction. In the water-gas shift reaction, carbon monoxide and water react to produce carbon dioxide and hydrogen. The hydrogen can be transferred to hydrocarbons in desulfurization reactions, demetallization reactions, denitrogenation reactions, and combinations of the same. The hydrogen can also reduce the olefin content. The production of an internal supply of hydrogen can reduce coke formation.

Without being bound to a particular theory, it is understood that the basic reaction mechanism of supercritical water mediated petroleum processes is the same as a free radical reaction mechanism. Radical reactions include initiation, propagation, and termination steps. With hydrocarbons, initiation is the most difficult step and conversion in supercritical water can be limited due to the high activation energy required for initiation. Initiation requires the breaking of chemical bonds. The bond energy of carbon-carbon bonds is about 350 kJ/mol, while the bond energy of carbon-hydrogen is about 420 kJ/mol. Due to the chemical bond energies, carbon-carbon bonds and carbon-hydrogen bonds do not break easily at the temperatures in a supercritical water process, 380° C. to 450° C., without catalyst or radical initiators. In contrast, aliphatic carbon-sulfur bonds have a bond energy of about 250 kJ/mol. The aliphatic carbon-sulfur bond, such as in thiols, sulfide, and disulfides, has a lower bond energy than the aromatic carbon-sulfur bond.

Thermal energy creates radicals through chemical bond breakage. Supercritical water creates a "cage effect" by surrounding the radicals. The radicals surrounded by water molecules cannot react easily with each other, and thus, intermolecular reactions that contribute to coke formation are suppressed. The cage effect suppresses coke formation by limiting inter-radical reactions. Supercritical water, having a low dielectric constant compared to liquid phase water, dissolves hydrocarbons and surrounds radicals to prevent the inter-radical reaction, which is the termination reaction resulting in condensation (dimerization or polymerization).

Moreover, the dielectric constant of supercritical water can be tuned by adjusting the temperature and pressure. Because of the barrier set by the supercritical water cage, hydrocarbon radical transfer is more difficult in supercritical water as compared to conventional thermal cracking processes, such as delayed coker, where radicals travel freely without such barriers.

Referring to FIG. 1 an embodiment of the system and process for upgrading heavy oil to produce syngas is provided.

Slurry catalyst 10 is introduced to catalyst pump 100. Slurry catalyst 10 contains a catalyst and water. The catalyst can be an alkali catalyst. Example alkali catalysts include potassium hydroxide (KOH), lithium hydroxide (LiOH), sodium hydroxide (NaOH), magnesium hydroxide (Mg(OH)$_2$), calcium hydroxide (Ca(OH)$_2$), rubidium hydroxide (RbOH), strontium hydroxide (SrOH)$_2$, and combinations of the same. The catalyst particles can have a size between 10 nanometers (nm) and 5 microns. The water in slurry catalyst 10 can be any source of deionized water. The water in slurry catalyst 10 can have a conductivity less than 1 microsiemens (μS)/centimeter (cm), alternately less than 0.5 μS/cm, and alternately less than 0.1 μS/cm. The water in slurry catalyst 10 can have a sodium content less than 5 micrograms (μg)/liter and alternately less than 1 μg/liter. The water in slurry catalyst 10 can have a chloride content less than 5 μg/liter and alternately less than 1 μg/liter. The water in slurry catalyst 10 can have a silica content less than 3 μg/liter.

Slurry catalyst 10 can be pressurized in catalyst pump 100 to produce pressurized slurry stream 20. Catalyst pump 100 can be any type of pump capable of increasing a pressure of a water-containing slurry stream. The pressure of pressurized slurry stream 20 can be between 22 MPa and 35 MPa. Pressurized slurry stream 20 can be introduced to slurry heater 110.

The temperature of pressurized slurry stream 15 can be increased in slurry heater 110 to produce hot slurry stream 30. The temperature of hot slurry stream 30 can be between 350° C. and 500° C. The temperature in slurry heater 110 and pressure in catalyst pump 100 are selected to maintain the water in hot slurry stream 30 in saturation conditions to avoid vaporizing the water and precipitating the catalyst particles.

Feed oil 5 can be introduced to oil pump 105. Feed oil 5 can be any type of heavy oil stream. Examples of heavy oil streams suitable for use as feed oil 5 include whole range crude oil, distilled crude oil, residue oil, topped crude oil, product streams from oil refineries, product streams from steam cracking processes, liquefied coals, liquid products recovered from oil or tar sands, bitumen, oil shale, asphaltene, biomass hydrocarbons, liquids products from gas-to-liquid GTL) processes, and combinations of the same. Feed oil 5 can have a sulfur content of greater than 0.1 weight percent (wt %), a nitrogen content greater than 500 wt ppm, an oxygen content less than 50 wt ppm, and combinations of the same. Feed oil 5 can be at a temperature between ambient and 150° C. The temperature of feed oil 5 can be elevated above ambient to reduce the viscosity to make feed oil 5 pumpable.

The pressure of feed oil 5 can be increased in oil pump 105 to produce pressurized feed stream 15. Oil pump 105 can be any type of pump capable of pumping a heavy oil stream. The pressure of pressurized feed stream 15 can be between 22 MPa and 35 MPa, and alternately between 23 MPa and 28 MPa. Pressurized feed stream 15 can be introduced to oil heater 115.

The temperature of pressurized feed stream 15 can be increased in oil heater 115 to produce hot oil stream 25. Oil heater 115 can be any type of heat exchanger capable of increasing a temperature of a heavy oil stream. The temperature of hot oil stream 25 can be between 100° C. and 380° C. and alternately between 150° C. and 250° C. Hot oil stream 25 can be introduced to mixer 120.

Hot slurry stream 30 and hot oil stream 25 can be mixed in mixer 120 to produce mixed stream 35. Mixer 120 can be any type of mixer capable of mixing a hot oil stream and a water stream. Examples of mixer 120 include standard inline mixer, a static mixer, and combinations of the same. The temperature of mixed stream 35 is at a temperature between 200° C. and 450° C. The temperature of mixed stream 35 depends on the temperature hot slurry stream 30 and hot oil stream 25. Mixed stream 35 can be introduced to combined heater 125.

Combined heater 125 can be any type of heat exchanger capable of heating a mixed oil and water stream to produce hot mixed stream 40. Hot mixed stream 40 can be at a temperature greater than the supercritical temperature of water. The temperature of hot mixed stream 40 can between 300° C. and 550° C. Hot mixed stream 40 is an oil-in-water emulsion with the catalyst particles dispersed in the emulsion such that the catalyst particles cannot precipitate. Hot mixed stream 40 can be introduced to supercritical reactor 135.

The mass flow ratio of water to oil in hot mixed stream 40 entering supercritical reactor 135 can be in the range of 5 to 15 and alternately in the range of 7 to 12.

Supercritical reactor 135 can be any type of reactor capable of maintaining catalytic reactions. Supercritical reactor 135 can be a tubular reactor oriented horizontally or vertically. Supercritical reactor 135 can be constructed from Inconel or stainless steel. In supercritical reactor 135, the catalyst particles catalyze upgrading reactions, including water-gas shift reaction, demetallization reactions, denitrogenation reactions, and desulfurization reactions of the hydrocarbons from feed oil 5. Supercritical reactor 135 is in the absence of externally provided hydrogen. Supercritical reactor 135 can be a tubular reactor. The tubular reactor can be designed to have an inner diameter and length to provide a high superficial velocity and Reynolds number greater than 3,000 and alternately greater than 6,000.

Optionally, in at least one embodiment, oxygen stream 42 can be introduced to supercritical reactor 135. Oxygen stream 42 can be any source of oxygen suitable to support gasification, reduce or eliminate coke formation, and enhance heating in the supercritical reactor. Examples of the oxygen source in oxygen stream 42 can include oxygen gas, hydrogen peroxide, peroxides, air, and combinations of the same. The flow rate of oxygen stream 42 can be determined by the oxygen to carbon molar ratio based on the amount of carbon in feed oil 5. The oxygen carbon molar ratio can be in the range of 0.0001 and 0.02. Maintaining the oxygen to carbon molar ratio in this range induces partial oxidation of hydrocarbons from feed oil 5 without combustion.

The residence time of supercritical reactor 135 is in the range of 0.01 minutes to 1.0 minutes and alternately in the range of 0.1 minutes to 0.5 minutes. The temperature in supercritical reactor 135 can be between 380° C. and 500° C., and alternately between 380° C. and 450° C. The pressure in supercritical reactor 135 can be between 22 MPa and 35 MPa, and alternately between 23 MPa and 28 MPa. In at least one embodiment, supercritical reactor 135 is at a temperature between 380° C. and 450° C. and at a pressure between 23 MPa and 28 MPa. Catalytic reactions of heavy oil occur in supercritical reactor 135 to produce supercritical effluent 45. Supercritical effluent 45 can be introduced to pressure let-down device 140.

Pressure let-down device 140 can be any type of unit capable of reducing the pressure of a stream containing solid particles. Examples of pressure let-down device 140 include a dome-type back pressure regulator, multistage pressure regulator, a pressure control valve, and combinations of the same. In at least one embodiment, pressure let-down device 140 is a multistage pressure regulator where the pressure is reduced in multiple stages. The pressure of supercritical effluent 45 is reduced in pressure let-down device 140 to produce depressurized effluent 50. The pressure of depressurized effluent 50 is between 0.1 MPa and 0.5 MPa. Depressurized effluent 50 can be introduced to separator 145.

Separator 145 can be any type of unit capable of separating vapor stream, a water stream, and an oil stream. Separator 145 can include a separator capable of separating multiple phases simultaneously or can be combination of two or more separators. Examples of separator 145 include a distillation column, a flash column, a gas-liquid separator, a liquid-liquid separator, and combinations of the same. In at least one embodiment, separator 145 can be a flash column, a gas-liquid separator, a liquid-liquid separator, and combination of the same. In embodiments where separator unit 126 includes a liquid-liquid separator, a demulsifier can be added to separator 145 to enhance the separation of oil and water. Depressurized effluent 50 is separated in separator 145 to produce gas stream 55, liquid hydrocarbon stream 52, and catalyst-containing water stream 54. Liquid hydrocarbon stream 52 contains liquid hydrocarbons. The liquid hydrocarbons include diesel, naphtha, distillates, heavy oils, and combinations of the same. Catalyst-containing water stream 54 contains catalyst particles and water. Gas stream 55 contains light hydrocarbon gases, hydrogen sulfide, hydrogen, carbon monoxide, carbon dioxide, and combinations of the same. The light hydrocarbon gases include methane, ethane, propane, butane, and combinations of the same. The hydrogen sulfide in gas stream 55 is hydrogen sulfide produce in supercritical reactor 135 due to the conversion of sulfur compounds. The yield of gas stream 55 is between 40 to 95 wt % and alternately between 50 to 70 wt %.

Gas stream 55 can be introduced to high pressure separator 150. High pressure separator 150 can be any type of separator capable of separating gaseous streams. Gas stream 55 is separated in high pressure separator 150 to produce light gas stream 62 and light hydrocarbon stream 60. Light gas stream 62 includes hydrogen, hydrogen sulfide, carbon monoxide, carbon dioxide, and combinations of the same. Hydrogen sulfide can be separated from light gas stream 62 using conventional hydrogen sulfide removal methods such as adsorption. Light hydrocarbon stream 60 includes the light hydrocarbon gases. Light hydrocarbon stream 60 can be introduced to reformer mixer 155.

Catalyst feed 64 can be introduced to reformer mixer 155. Catalyst feed 64 can include catalyst particles dispersed in water. Catalyst feed 64 can include the same type of catalyst used in slurry catalyst 10. In at least one embodiment, catalyst feed 64 can be from catalyst regeneration unit 175.

Optionally, catalyst-containing water stream 54 can be introduced to catalyst regeneration unit 175. Catalyst regeneration unit 175 can be any type of unit capable of regenerating and reactivating the catalyst in catalyst-containing water stream 54. Catalyst regeneration unit 175 can include a heater. Catalyst regeneration unit 175 can operate at a regeneration temperature of between 785° C. and 875° C. and a regeneration pressure of between 3 bar and 6 bar. Regenerating and reactivating the catalyst in catalyst-containing water stream 54 returns the catalytic function to the catalyst such that the catalyst is capable of catalyzing reactions. In at least one embodiment, catalyst regeneration unit 175 produces catalyst feed 64.

Reformer mixer 155 can be any type of mixer capable of mixing a gaseous stream with a liquid stream. Examples of reformer mixer 155 include t-fitting mixer, y-fitting mixer, a line mixer, a static mixer, and combinations of the same. Light hydrocarbon stream 60 and catalyst feed 64 are mixed in reformer mixer 155 to produce combined feed 65. Combined feed 65 can be introduced to reformer heater 160.

Reformer heater 160 can be any type of heat exchanger capable of increasing the temperature of combined feed 65. The temperature of combined feed 65 can be increased in reformer heater 160 to produce hot feed 70. The temperature of hot feed 70 can be in the range of 500° C. and 800° C. and alternately between 550° C. and 700° C. Hot feed 70 can be introduced to steam reformer 165.

Steam reformer 165 can be any type of reactor capable of operating to produce syngas. Steam reformer 165 can be a tubular reactor. Steam reformer 165 can be constructed from stainless steel or Inconel. The temperature in steam reformer 165 can be between 500° C. and 800° C. The pressure in steam reformer 165 can be between atmospheric and 0.5 MPa. Syngas reactions occur in steam reformer 165 to convert the light hydrocarbon gases in hot feed 70 to syngas in the presence of the catalyst. The catalyst in steam reformer 165 can be any catalyst capable of promoting the water gas shift reaction and reducing carbon dioxide production. Examples of the catalyst in steam reformer 165 include an alkali catalyst and a combination of an alkali metal and a transition metal. Examples of the catalyst in steam reformer 165 include nickel on an aluminum oxide support ($Ni/Al_2O_3$) or nickel on an aluminum oxide-silicon support ($Ni/Al_2O_3$—$SiO_2$). The nickel catalysts can include alkali metals as promoters. The catalyst particles of the catalyst in steam reformer 165 can be in the range of 115 microns to 250 microns. Steam reformer 165 can be a fixed bed reactor or can be a moving bed reactor where the catalyst is continuously withdrawn and regenerated. Reformer effluent 75 exits steam reformer 165. Reformer effluent 165 includes syngas, carbon dioxide, light hydrocarbon gases, water, and combinations of the same.

Reformer effluent 75 is separated in product separator 170 to produce product gas 82. In embodiments where steam reformer 165 is a moving bed reactor, reformer effluent 165 contains catalyst dispersed in the water phase and product separator 170 produces water waste stream 80, where water waste stream 80 contains water and the catalyst from steam reformer 165 as shown in FIG. 1. In embodiments where steam reformer 165 is a fixed bed reactor, reformer effluent 165 is in the absence of catalyst and product separator 170 produces water product 84, as shown in FIG. 2.

In at least one embodiment, the catalyst in the supercritical reactor is in the absence of alkaline earth elements, which cannot withstand harsh process conditions of supercritical water and would disintegrate, sinter and cause equipment and lines to plug.

EXAMPLES

Figure 2:
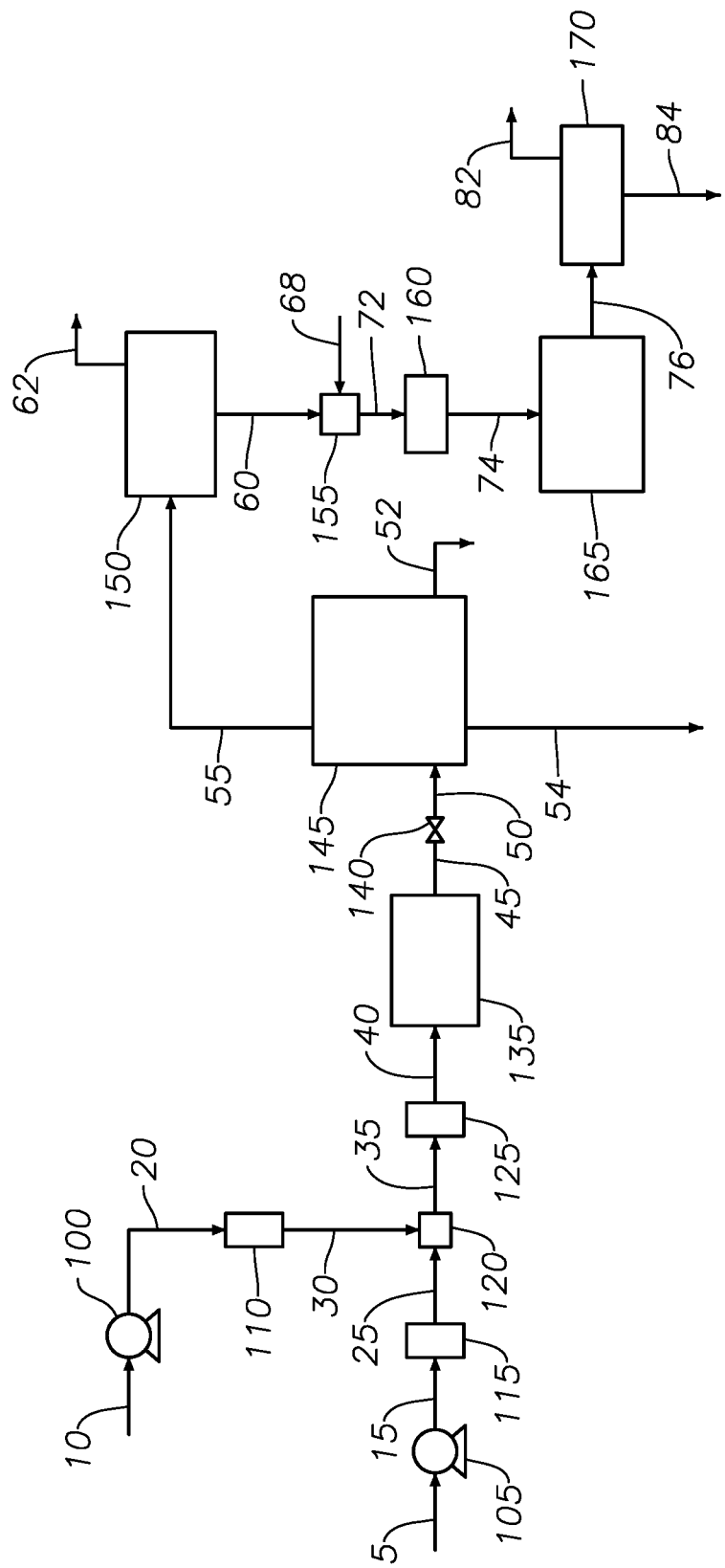
FIG. 2 provides a process diagram of an embodiment of the integrated supercritical reactor and steam reformer.

Example 1 was modeled on FIG. 2. Feed oil 5 was an atmospheric residue from an Arabian Light crude oil from a crude distillation unit having the properties shown in Table 1. The flow rate was 82.8 g/h.

TABLE 1

Properties of Feed Oil 5

| Property | Unit | Value |
|---|---|---|
| Specific Gravity | API Gravity | 13.8 |
| Total Sulfur | wt % sulfur | 3.4 |
| Distillation (TBP) | | |
| 5% | ° C. | 376 |
| 10% | ° C. | 400 |
| 30% | ° C. | 462 |
| 50% | ° C. | 521 |
| 70% | ° C. | 585 |
| 90% | ° C. | 670 |
| 95% | ° C. | 702 |
| Viscosity @ 122° F. (° C.) | cSt | 595 |
| Vanadium Content | Wt ppm | 38.3 |

The deionized water in slurry catalyst was an ASTM Type 1 water produced by a water purification system with a conductivity of about 0.056 μS/cm. The catalyst was potassium hydroxide (KOH) and the slurry catalyst had a flow rate equal to 543 g/h. The residence time in supercritical reactor 135 was 3.2 seconds, the temperature was 700° C., the pressure was 250 bar. The mass balance and distribution of gas, liquid and coke are shown in Table 2.

TABLE 2

Mass balance on Supercritical Reactor

Mass Balance around Supercritical Reactor 135

| | Oil | Gas | Coke |
|---|---|---|---|
| Hot Mixed Feed 40 | 82.8 g/h | — | — |
| Reactor Effluent 45 | 24.6 g/h | 57.12 g/h | 1.08 |

| | Coke | Gas | Liquid |
|---|---|---|---|
| Product Distribution (wt %) | 1.30 | 68.99 | 29.71 |

The distribution of components in the gas phase of reactor effluent 45 is shown in Table 3.

TABLE 3

Distribution of Components in Gas Phase
Gas Distribution (mol %)

| | |
|---|---|
| $H_2$ | 21% |
| CO | 1% |
| $CO_2$ | 4% |
| $C_1$ | 36% |
| $C_2$ | 14% |
| $C_2$=/$C_3$ | 13% |
| $C_3$ | 11% |

Light hydrocarbon stream 60 contained all of the light hydrocarbons from the gas phase of reactor effluent 45. Steam reformer 165 was a fixed-bed down flow reactor. The catalyst was a $Ni/Al_2O_3$. The oil to water ratio in steam reformer 165 was 1. The temperature in steam reformer 165 was 750° C. and the pressure was 4 bar. The feed conversion to hydrogen was 35.8%.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

There various elements described can be used in combination with all other elements described here unless otherwise indicated.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed here as from about one particular value to about another particular value and are inclusive unless otherwise indicated. When such a range is expressed, it is to be understood that another embodiment is from the one particular value to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these references contradict the statements made here.

As used here and in the appended claims, the words "comprise," "has," and "include" and all grammatical variations thereof are each intended to have an open, non-limiting meaning that does not exclude additional elements or steps.

That which is claimed is:

1. A method to produce syngas from a feed oil, the method comprising the steps of:
   increasing a pressure of a slurry catalyst in a catalyst pump to produce a pressurized slurry stream, where the slurry catalyst comprises catalyst particles dispersed in deionized water;
   increasing a temperature of the pressurized slurry stream in a slurry heater to produce a hot slurry stream;
   increasing a pressure of the feed oil in an oil pump to produce a pressurized feed stream, wherein the feed oil comprises a heavy oil;
   increasing a temperature of the pressurized feed stream in an oil heater to produce a hot oil stream, where the temperature of the hot oil stream is between 100° C. and 380° C.;
   mixing the hot slurry stream and the hot oil stream in a mixer to produce a mixed stream;
   increasing a temperature of the mixed stream in a combined heater to produce a hot mixed stream, wherein the hot mixed stream comprises an oil-in-water emulsion comprising catalyst particles dispersed in the emulsion such that precipitation of the catalyst particles is minimized;
   introducing the hot mixed stream to a supercritical reactor, wherein the supercritical reactor is at a temperature between 380° C. and 500° C. and a pressure between 22 MPa and 35 MPa;
   maintaining upgrading reactions of hydrocarbons in the supercritical reactor to produce a supercritical effluent, wherein the catalyst particles catalyze the upgrading reactions, wherein a residence time in supercritical reactor is in the range of 0.01 minutes to 1.0 minute;
   reducing a pressure of the supercritical effluent in a pressure let-down device to produce a depressurized effluent;
   separating the depressurized effluent in a separator to produce a gas stream, a catalyst-containing water stream and a liquid hydrocarbon stream, wherein the gas stream comprises light hydrocarbon gases, syngas, carbon dioxide, and combinations of the same, where the light hydrocarbon gases are selected from the group consisting of methane, ethane, propane, butane, and combinations of the same;
   separating the gas stream in a high pressure separator to produce a light gas stream and a light hydrocarbon stream, wherein the light hydrocarbon stream comprises the light hydrocarbon gases;
   mixing the light hydrocarbon stream and a catalyst feed in a reformer mixer to produce a combined feed, wherein the combined comprises light hydrocarbon gases, water, and catalyst;
   increasing a temperature of the combined feed in a reformer heater to produce a hot feed, wherein the hot feed is at a temperature between 500° C. and 800° C.;
   introducing the hot feed to a steam reformer, wherein the steam reformer is at a temperature between 500° C. and 800° C. and a pressure between atmospheric pressure and 0.5 MPa;
   maintaining water gas shift reactions of the light hydrocarbon gases in the steam reformer to produce a reformer effluent, wherein the catalyst from the catalyst feed catalyzes the water gas shift reactions; and
   separating the reformer effluent in a product separator to produce a product gas, wherein the product gas comprises syngas.

2. The method of claim 1, wherein the steam reformer is a fixed bed reactor.

3. The method of claim 1, wherein the steam reformer is a moving bed reactor.

4. The method of claim 1, further comprising the step of introducing an oxygen stream to the supercritical reactor, wherein the oxygen source is selected from the group consisting of oxygen gas, hydrogen peroxide, peroxides, air, and combinations of the same.

5. The method of claim 1, wherein a mass flow ratio of water to oil in the hot mixed stream is in the range of 5 to 15.

6. The method of claim 1, wherein the liquid hydrocarbon stream comprises liquid hydrocarbons, wherein the liquid hydrocarbons are selected from the group consisting of diesel, naphtha, distillates, heavy oils, and combinations of the same.

7. The method of claim 1, wherein the catalyst in the supercritical reactor is the same catalyst in the steam reformer.

8. The method of claim 1, wherein a temperature of the hot slurry is between 350° C. and 500° C.

9. The method of claim 1, wherein a pressure of the depressurized effluent is between ambient pressure and 0.5 MPa.

10. The method of claim 1, wherein the heavy oil of the feed oil is selected from the group consisting of whole range crude oil, distilled crude oil, residue oil, topped crude oil, product streams from oil refineries, product streams from steam cracking processes, liquefied coals, liquid products recovered from oil or tar sands, bitumen, oil shale, asphaltene, biomass hydrocarbons, liquids products from gas-to-liquid GTL) processes, and combinations of the same.

11. A system to produce syngas from a feed oil, the system comprising:

a catalyst pump configured to increase a pressure of a slurry catalyst to produce a pressurized slurry stream, where the slurry catalyst comprises catalyst particles dispersed in deionized water;

a slurry heater fluidly connected to the catalyst pump, the slurry heater configured to increase a temperature of the pressurized slurry stream to produce a hot slurry stream;

an oil pump configured to increase a pressure of the feed oil to produce a pressurized feed stream, wherein the feed oil comprises a heavy oil;

an oil heater fluidly connected to the oil pump, the oil heater configured to increase a temperature of the pressurized feed stream to produce a hot oil stream, where the temperature of the hot oil stream is between 100° C. and 380° C.;

a mixer fluidly connected to the slurry heater and the oil heater, the mixer configured to mix the hot slurry stream and the hot oil stream to produce a mixed stream;

a combined heater fluidly connected to the mixer, the combined heater configured to increase a temperature of the mixed stream to produce a hot mixed stream, wherein the hot mixed stream comprises an oil-in-water emulsion comprising catalyst particles dispersed in the emulsion such that precipitation of the catalyst particles is minimized;

a supercritical reactor fluidly connected to the combined heater, the supercritical reactor configured to maintain upgrading reactions of hydrocarbons in the hot mixed stream to produce a supercritical effluent, wherein the catalyst particles catalyze the upgrading reactions, wherein a residence time in supercritical reactor is in the range of 0.01 minutes to 1.0 minute, wherein the supercritical reactor is at a temperature between 380° C. and 500° C. and a pressure between 22 MPa and 35 MPa;

a pressure let-down device fluidly connected to the supercritical reactor, the pressure let-down device configured to reduce a pressure of the supercritical effluent to produce a depressurized effluent;

a separator fluidly connected to the pressure let-down device, the separator configured to separate the depressurized effluent to produce a gas stream, a catalyst-containing water stream and a liquid hydrocarbon stream, wherein the gas stream comprises light hydrocarbon gases, syngas, carbon dioxide, and combinations of the same, where the light hydrocarbon gases are selected from the group consisting of methane, ethane, propane, butane, and combinations of the same;

a high pressure separator fluidly connected to the separator, the high pressure separator configured to separate the gas stream to produce a light gas stream and a light hydrocarbon stream, wherein the light hydrocarbon stream comprises the light hydrocarbon gases;

a reformer mixer fluidly connected to the high pressure separator, the reformer mixer configured to mix the light hydrocarbon stream and a catalyst feed to produce a combined feed, wherein the combined comprises light hydrocarbon gases, water, and catalyst;

a reformer heater fluidly connected to the reformer mixer, the reformer heater configured to increase a temperature of the combined feed to produce a hot feed, wherein the hot feed is at a temperature between 500° C. and 800° C.;

a steam reformer fluidly connected to the reformer heater, the steam reformer configured to maintain water gas shift reactions of the light hydrocarbon gases to produce a reformer effluent, wherein the catalyst from the catalyst feed catalyzes the water gas shift reactions, wherein the steam reformer is at a temperature between 500° C. and 800° C. and a pressure between atmospheric pressure and 0.5 MPa; and a product separator fluidly connected to the steam reformer, the product separator configured to separate the reformer effluent to produce a product gas, wherein the product gas comprises syngas.

12. The system of claim 11, wherein the steam reformer is a fixed bed reactor.

13. The system of claim 11, wherein the steam reformer is a moving bed reactor.

14. The system of claim 11, wherein a mass flow ratio of water to oil in the hot mixed stream is in the range of 5 to 15.

15. The system of claim 11, wherein the liquid hydrocarbon stream comprises liquid hydrocarbons, wherein the liquid hydrocarbons are selected from the group consisting of diesel, naphtha, distillates, heavy oils, and combinations of the same.

16. The system of claim 11, wherein the catalyst in the supercritical reactor is the same catalyst in the steam reformer.

17. The system of claim 11, wherein a temperature of the hot slurry is between 350° C. and 500° C.

18. The system of claim 11, wherein a pressure of the depressurized effluent is between ambient pressure and 0.5 MPa.

19. The system of claim 11, wherein the heavy oil of the feed oil is selected from the group consisting of whole range crude oil, distilled crude oil, residue oil, topped crude oil, product streams from oil refineries, product streams from steam cracking processes, liquefied coals, liquid products recovered from oil or tar sands, bitumen, oil shale, asphaltene, biomass hydrocarbons, liquids products from gas-to-liquid GTL) processes, and combinations of the same.

20. The system of claim 11, wherein the supercritical reactor is a tubular reactor.

* * * * *